(12) United States Patent
Lee et al.

(10) Patent No.: US 9,316,738 B2
(45) Date of Patent: Apr. 19, 2016

(54) METHOD AND APPARATUS FOR CONTROLLING A MOBILE DEVICE BEYOND AN AREA OF INTEREST BOUNDARY

(75) Inventors: Sean S. Lee, Rockville, MD (US); Jorge Guzman, Gaithersburg, MD (US)

(73) Assignee: The DIRECTV Group, Inc., El Segundo, CA (US)

(*) Notice: Subject to any disclaimer, the term of this patent is extended or adjusted under 35 U.S.C. 154(b) by 2366 days.

(21) Appl. No.: 11/545,278

(22) Filed: Oct. 10, 2006

(65) Prior Publication Data

US 2007/0149219 A1 Jun. 28, 2007

Related U.S. Application Data

(63) Continuation-in-part of application No. 11/443,787, filed on May 31, 2006.

(60) Provisional application No. 60/754,480, filed on Dec. 28, 2005.

(51) Int. Cl.
*H04W 4/02* (2009.01)
*G01S 19/14* (2010.01)

(52) U.S. Cl.
CPC ..................................... *G01S 19/14* (2013.01)

(58) Field of Classification Search
CPC ................................ H04W 4/02; H04W 84/06
USPC ............................................. 455/456.3, 428
See application file for complete search history.

(56) References Cited

U.S. PATENT DOCUMENTS

| 3,860,746 A | 1/1975 | Takeuchi |
| 3,993,955 A | 11/1976 | Belcher et al. |
| 4,155,042 A | 5/1979 | Permut et al. |
| 4,390,904 A | 6/1983 | Johnston et al. |
| 5,070,404 A | 12/1991 | Bullock et al. |
| 5,121,430 A | 6/1992 | Ganzer et al. |
| 5,214,622 A * | 5/1993 | Nemoto et al. ............ 368/10 |
| 5,260,778 A | 11/1993 | Kauffman et al. |
| 5,388,101 A | 2/1995 | Dinkins |
| 5,410,728 A | 4/1995 | Bertiger et al. |

(Continued)

FOREIGN PATENT DOCUMENTS

| EP | 0831606 A2 | 3/1998 |
| FR | 2789246 | 8/2000 |

(Continued)

OTHER PUBLICATIONS

Zhang, Yanchao; Liu, Wei; Fang, Yugang; "Secure Localization in Wireless Sensor Networks"; IEEE Military Communications Conference; Oct. 2005; pp. 3169-3175; vol. 5.

(Continued)

*Primary Examiner* — Hai V Nguyen (57) ABSTRACT

A mobile wireless system (10) includes a transmitter such as a satellite (18) that broadcasts wireless signals such as boundaries for specific areas to a mobile receiving device (22). Mobile receiving device (22) may include an antenna (26) and a mobile receiving device (28). A locating receiver (50) is used to generate locating signals so that a determination may be made to the location of the mobile receiving device. When the location is outside an area of interest the area of interest may be extended to provide services to the mobile device.

5 Claims, 9 Drawing Sheets

(56) References Cited

U.S. PATENT DOCUMENTS

| | | | |
|---|---|---|---|
| 5,432,542 A | 7/1995 | Thibadeau et al. | |
| 5,448,623 A | 9/1995 | Wiedeman et al. | |
| 5,491,717 A | 2/1996 | Hall | |
| 5,512,935 A | 4/1996 | Majeti et al. | |
| 5,565,909 A * | 10/1996 | Thibadeau et al. | 725/35 |
| 5,574,968 A | 11/1996 | Olds et al. | |
| 5,585,858 A | 12/1996 | Harper et al. | |
| 5,625,867 A | 4/1997 | Rouffet et al. | |
| 5,625,868 A | 4/1997 | Jan et al. | |
| 5,636,245 A | 6/1997 | Ernst et al. | |
| 5,659,366 A | 8/1997 | Kerman | |
| 5,664,948 A | 9/1997 | Dimitriadis et al. | |
| 5,701,161 A | 12/1997 | Williams et al. | |
| 5,760,820 A | 6/1998 | Eda et al. | |
| 5,825,407 A | 10/1998 | Cowe et al. | |
| 5,826,188 A | 10/1998 | Tayloe et al. | |
| 5,826,190 A | 10/1998 | Krutz et al. | |
| 5,838,277 A | 11/1998 | Loomis et al. | |
| 5,850,218 A | 12/1998 | LaJoie et al. | |
| 5,920,626 A | 7/1999 | Durden et al. | |
| 5,920,804 A | 7/1999 | Armbruster et al. | |
| 5,949,350 A * | 9/1999 | Girard et al. | 340/825.49 |
| 6,005,605 A * | 12/1999 | Kostreski et al. | 348/21 |
| 6,009,116 A * | 12/1999 | Bednarek et al. | 375/130 |
| 6,020,913 A | 2/2000 | Bush et al. | |
| 6,029,045 A | 2/2000 | Picco et al. | |
| 6,091,956 A * | 7/2000 | Hollenberg | 455/456.5 |
| 6,115,667 A | 9/2000 | Nakamura | |
| 6,119,065 A * | 9/2000 | Shimada et al. | 701/201 |
| 6,140,943 A * | 10/2000 | Levine | 340/995.12 |
| 6,205,582 B1 | 3/2001 | Hoarty | |
| 6,233,451 B1 | 5/2001 | Noerpel et al. | |
| 6,240,369 B1 * | 5/2001 | Foust | 702/3 |
| 6,266,816 B1 | 7/2001 | Watson et al. | |
| 6,334,059 B1 * | 12/2001 | Stilp et al. | 455/404.2 |
| 6,340,997 B1 | 1/2002 | Borseth | |
| 6,362,778 B2 * | 3/2002 | Neher | 342/357.07 |
| 6,396,537 B1 * | 5/2002 | Squilla et al. | 348/239 |
| 6,400,941 B1 * | 6/2002 | Nara | 455/422.1 |
| 6,424,840 B1 | 7/2002 | Fitch et al. | |
| 6,509,908 B1 * | 1/2003 | Croy et al. | 715/716 |
| 6,522,875 B1 * | 2/2003 | Dowling | H04L 12/1859 340/995.1 |
| 6,529,742 B1 | 3/2003 | Yang | |
| 6,543,051 B1 | 4/2003 | Manson et al. | |
| 6,546,246 B1 * | 4/2003 | Bridges et al. | 455/432.1 |
| 6,552,661 B1 | 4/2003 | Lastinger et al. | |
| 6,553,232 B1 | 4/2003 | Shaffer et al. | |
| 6,571,096 B2 | 5/2003 | Plunkett | |
| 6,636,272 B1 * | 10/2003 | Noguchi et al. | 348/734 |
| 6,698,020 B1 | 2/2004 | Zigmond et al. | |
| 6,704,931 B1 * | 3/2004 | Schaffer et al. | 725/46 |
| 6,728,967 B2 * | 4/2004 | Bennington et al. | 725/43 |
| 6,772,433 B1 | 8/2004 | La Joie et al. | |
| 6,782,392 B1 | 8/2004 | Weinberger et al. | |
| 6,785,551 B1 | 8/2004 | Richard | |
| 6,806,830 B2 | 10/2004 | Panasik et al. | |
| 6,907,245 B2 | 6/2005 | Ohlsson et al. | |
| 6,952,574 B2 | 10/2005 | Tealdi et al. | |
| 6,968,206 B1 | 11/2005 | Whitsey-Anderson | |
| 6,975,997 B1 * | 12/2005 | Murakami et al. | 705/5 |
| 7,020,455 B2 | 3/2006 | Krishnarajah et al. | |
| 7,034,695 B2 | 4/2006 | Troxler | |
| 7,035,321 B2 * | 4/2006 | Balaberda | 375/213 |
| 7,039,393 B1 * | 5/2006 | Kite | 455/412.2 |
| 7,072,666 B1 * | 7/2006 | Kullman | H04W 64/00 455/404.2 |
| 7,107,046 B1 | 9/2006 | Mainard et al. | |
| 7,113,781 B1 * | 9/2006 | Allison | H04Q 3/0025 455/401 |
| 7,130,610 B2 | 10/2006 | Dolezal et al. | |
| 7,164,986 B2 | 1/2007 | Humphries et al. | |
| 7,174,308 B2 * | 2/2007 | Bergman et al. | 705/26 |
| 7,206,610 B2 * | 4/2007 | Iacono et al. | 455/562.1 |
| 7,209,739 B1 * | 4/2007 | Narayanabhatla | 455/426.2 |
| 7,233,781 B2 * | 6/2007 | Hunter et al. | 455/404.1 |
| 7,239,871 B2 * | 7/2007 | Shamp | G06Q 30/0207 370/328 |
| 7,248,872 B2 * | 7/2007 | Bassett et al. | 455/433 |
| 7,251,318 B1 * | 7/2007 | Henderson | 379/142.04 |
| 7,317,927 B2 * | 1/2008 | Staton et al. | 455/456.4 |
| 7,319,386 B2 * | 1/2008 | Collins et al. | 340/539.12 |
| 7,333,818 B2 * | 2/2008 | Dunn | 455/456.1 |
| 7,359,724 B2 | 4/2008 | Torvinen | |
| 7,362,952 B2 * | 4/2008 | Katagishi et al. | 386/291 |
| 7,421,724 B2 * | 9/2008 | Klosterman et al. | 725/42 |
| 7,424,286 B2 * | 9/2008 | Okada | 455/414.1 |
| 7,460,883 B1 * | 12/2008 | McBrearty et al. | 455/550.1 |
| 7,489,939 B2 * | 2/2009 | Ashley et al. | 455/456.6 |
| 7,522,556 B2 * | 4/2009 | Hanna et al. | 370/329 |
| 7,548,747 B2 * | 6/2009 | Yang | 455/418 |
| 7,558,558 B2 * | 7/2009 | Langsenkamp et al. | 455/404.1 |
| 7,593,689 B2 * | 9/2009 | Allen et al. | 455/7 |
| 7,684,782 B2 * | 3/2010 | Ashley et al. | 455/404.2 |
| 7,714,778 B2 * | 5/2010 | Dupray | 342/357.01 |
| 7,720,431 B2 * | 5/2010 | Lee | 455/3.01 |
| 7,738,879 B1 * | 6/2010 | Fingerhut | H04W 4/02 455/414.2 |
| 7,788,294 B2 * | 8/2010 | Van Wart et al. | 707/804 |
| 7,859,392 B2 * | 12/2010 | McClellan et al. | 340/441 |
| 7,876,205 B2 * | 1/2011 | Catten et al. | 340/439 |
| 7,899,610 B2 * | 3/2011 | McClellan | 701/115 |
| 7,953,414 B2 | 5/2011 | Tamura et al. | |
| 8,027,304 B2 | 9/2011 | Forsberg | |
| 8,099,109 B2 * | 1/2012 | Altman | G06Q 30/0207 455/414.3 |
| 8,126,480 B2 * | 2/2012 | Morrison | G08G 1/096716 455/456.3 |
| 8,554,625 B2 * | 10/2013 | Agarwal | G06Q 30/02 705/14.5 |
| 8,594,704 B2 | 11/2013 | Karabinis | |
| 9,170,705 B1 * | 10/2015 | Kelm | G06Q 30/0256 |
| 2002/0028682 A1 | 3/2002 | Fitch et al. | |
| 2002/0042276 A1 | 4/2002 | Hakalin et al. | |
| 2002/0060747 A1 | 5/2002 | Nonomura | 348/465 |
| 2002/0072361 A1 * | 6/2002 | Knoblach et al. | 455/431 |
| 2002/0100043 A1 | 7/2002 | Lowthert et al. | |
| 2002/0106987 A1 | 8/2002 | Linden | |
| 2002/0124252 A1 | 9/2002 | Schaefer et al. | |
| 2002/0151327 A1 | 10/2002 | Levitt | |
| 2002/0161633 A1 | 10/2002 | Jacob et al. | |
| 2002/0167442 A1 | 11/2002 | Taylor | |
| 2002/0167965 A1 | 11/2002 | Beasley et al. | |
| 2003/0008656 A1 | 1/2003 | Yamashita et al. | |
| 2003/0054809 A1 * | 3/2003 | Bridges et al. | 455/419 |
| 2003/0066078 A1 | 4/2003 | Bjorgan et al. | |
| 2003/0069648 A1 * | 4/2003 | Douglas et al. | 700/2 |
| 2003/0096574 A1 | 5/2003 | Anderson et al. | |
| 2003/0100307 A1 | 5/2003 | Wolochow et al. | |
| 2003/0139175 A1 * | 7/2003 | Kim | 455/419 |
| 2003/0148771 A1 | 8/2003 | de Verteuil | |
| 2003/0181160 A1 | 9/2003 | Hirsch | |
| 2003/0188113 A1 | 10/2003 | Grawrock et al. | |
| 2003/0211827 A1 * | 11/2003 | Yonezawa et al. | 455/7 |
| 2003/0217362 A1 | 11/2003 | Summers et al. | |
| 2003/0221191 A1 | 11/2003 | Khusheim | |
| 2004/0019900 A1 | 1/2004 | Knightbridge et al. | |
| 2004/0038665 A1 * | 2/2004 | Hosono | H04M 3/4878 455/404.2 |
| 2004/0095992 A1 * | 5/2004 | Balaberda | 375/213 |
| 2004/0117505 A1 * | 6/2004 | Faccin | H04L 45/02 709/242 |
| 2004/0125769 A1 | 7/2004 | Vare | |
| 2004/0128065 A1 * | 7/2004 | Taylor et al. | 701/201 |
| 2004/0128682 A1 | 7/2004 | Liga et al. | |
| 2004/0137938 A1 * | 7/2004 | Deubler, Jr. | 455/550.1 |
| 2004/0147221 A1 * | 7/2004 | Sheynblat et al. | 455/12.1 |
| 2004/0156097 A1 * | 8/2004 | Roper et al. | 359/341.41 |
| 2004/0198217 A1 | 10/2004 | Lee et al. | |
| 2004/0205829 A1 | 10/2004 | Hane, III. | |
| 2004/0219932 A1 | 11/2004 | Verteuil | |
| 2004/0244035 A1 | 12/2004 | Wright et al. | |
| 2005/0025089 A1 | 2/2005 | Walker et al. | |
| 2005/0055729 A1 | 3/2005 | Atad et al. | |

(56) References Cited

U.S. PATENT DOCUMENTS

| | | |
|---|---|---|
| 2005/0101314 A1* | 5/2005 | Levi .............................. 455/423 |
| 2005/0104797 A1 | 5/2005 | McCollum |
| 2005/0118949 A1* | 6/2005 | Allen et al. .................. 455/13.4 |
| 2005/0143005 A1 | 6/2005 | Moore, III |
| 2005/0146429 A1* | 7/2005 | Spoltore et al. .............. 340/525 |
| 2005/0154531 A1* | 7/2005 | Kelly et al. ....................... 702/3 |
| 2005/0163078 A1 | 7/2005 | Oba et al. |
| 2005/0176368 A1* | 8/2005 | Young et al. ................. 455/11.1 |
| 2005/0182932 A1 | 8/2005 | Wheeler |
| 2005/0186931 A1* | 8/2005 | Laiho et al. ................... 455/280 |
| 2005/0200555 A1 | 9/2005 | McCollum |
| 2005/0203927 A1 | 9/2005 | Sull et al. |
| 2005/0232194 A1* | 10/2005 | Hanna et al. .................. 370/329 |
| 2005/0235310 A1* | 10/2005 | Bies ................................ 725/34 |
| 2005/0249139 A1 | 11/2005 | Nesbit |
| 2005/0255889 A1* | 11/2005 | Haseba et al. ................. 455/561 |
| 2005/0272368 A1* | 12/2005 | Langsenkamp et al. ...... 455/12.1 |
| 2005/0272412 A1* | 12/2005 | Langsenkamp et al. ... 455/414.2 |
| 2006/0023848 A1* | 2/2006 | Mohler et al. ................... 379/41 |
| 2006/0034351 A1* | 2/2006 | Kellett et al. .................. 375/147 |
| 2006/0046712 A1* | 3/2006 | Shamp ............... G06Q 30/0207 455/426.1 |
| 2006/0063559 A1 | 3/2006 | Fruit et al. |
| 2006/0085310 A1 | 4/2006 | Mylet et al. |
| 2006/0105771 A1* | 5/2006 | Iacono et al. .................. 455/446 |
| 2006/0111109 A1 | 5/2006 | Kim |
| 2006/0130100 A1* | 6/2006 | Pentland .......................... 725/68 |
| 2006/0205344 A1* | 9/2006 | Roper et al. .................. 455/11.1 |
| 2006/0209743 A1 | 9/2006 | Matero et al. |
| 2006/0211437 A1* | 9/2006 | Yang .............................. 455/518 |
| 2006/0276150 A1 | 12/2006 | Ogasawara |
| 2006/0286989 A1* | 12/2006 | Illion ..................... G06Q 30/02 455/456.3 |
| 2007/0060171 A1 | 3/2007 | Sudit et al. |
| 2007/0113243 A1 | 5/2007 | Brey |
| 2007/0146200 A1 | 6/2007 | Norin et al. |
| 2007/0149167 A1* | 6/2007 | Lee .............................. 455/404.2 |
| 2007/0149218 A1* | 6/2007 | Lee ............................. 455/456.3 |
| 2007/0149219 A1* | 6/2007 | Lee et al. .................... 455/456.3 |
| 2007/0150918 A1 | 6/2007 | Carpenter et al. |
| 2007/0176792 A1* | 8/2007 | Butzer et al. .................. 340/931 |
| 2007/0191063 A1* | 8/2007 | Iacono et al. .................. 455/561 |
| 2007/0254659 A1 | 11/2007 | Paul et al. |
| 2008/0015771 A1* | 1/2008 | Breed et al. .................... 701/207 |
| 2008/0133336 A1* | 6/2008 | Altman ............... G06Q 30/0207 455/456.1 |
| 2008/0140529 A1* | 6/2008 | Agarwal ................ G06Q 30/02 705/14.54 |
| 2008/0162037 A1* | 7/2008 | Hasan Mahmoud ... G01C 21/30 701/532 |
| 2008/0195469 A1* | 8/2008 | Toneguzzo ....................... 705/14 |
| 2008/0212500 A1* | 9/2008 | Zhen et al. ..................... 370/277 |
| 2008/0212502 A1* | 9/2008 | Zhen et al. ..................... 370/295 |
| 2008/0268830 A1 | 10/2008 | Sharma et al. |
| 2008/0301727 A1 | 12/2008 | Cristofalo et al. |
| 2008/0311994 A1 | 12/2008 | Amaitis et al. |
| 2009/0215445 A1* | 8/2009 | Yang ............................ 455/426.1 |
| 2010/0017261 A1* | 1/2010 | Evans .................... G06Q 30/02 705/7.34 |
| 2010/0100439 A1* | 4/2010 | Jutla ................. G06Q 30/0254 705/14.52 |
| 2010/0191824 A1* | 7/2010 | Lindsay ......................... 709/217 |
| 2010/0272081 A1* | 10/2010 | Laroia ................ H04W 72/042 370/338 |
| 2011/0065458 A1* | 3/2011 | Staton et al. ................. 455/456.6 |
| 2012/0096490 A1* | 4/2012 | Barnes, Jr. ............. G06Q 10/02 725/34 |

FOREIGN PATENT DOCUMENTS

| | | |
|---|---|---|
| GB | 2344009 | 5/2000 |
| WO | WO 03/094017 | 11/2003 |
| WO | 2006072825 A1 | 7/2006 |

OTHER PUBLICATIONS

Advisory Action dated Jan. 30, 2009 in U.S. Appl. No. 11/319,673, filed Dec. 28, 2005 by Sean S. Lee et al.
Non-final Office Action dated Mar. 4, 2009 in U.S. Appl. No. 11/443,787, filed May 31, 2006 by Sean S. Lee.
Non-final Office Action dated Apr. 29, 2009 in U.S. Appl. No. 11/319,673, filed Dec. 28, 2005 by Sean S. Lee et al.
Non-final Office Action dated May 19, 2008 in U.S. Appl. No. 11/319,673, filed Dec. 28, 2005 by Sean S. Lee et al.
Final Rejection dated Jul. 21, 2009 in U.S. Appl. No. 11/320,318, filed Dec. 28, 2005 by Sean S. Lee et al.
Microsoft Computer Dictionary, Fourth Edition, 1999; pp. 403-404; definition of "server".
U.S. Appl. No. 09/964,231, filed Sep. 26, 2001, Curtis et al.
Final Rejection dated Nov. 19, 2008 in U.S. Appl. No. 11/319,673, filed Dec. 28, 2005 by Sean S. Lee et al.
Final Rejection dated Nov. 24, 2009 in U.S. Appl. No. 11/319,673, filed Dec. 28, 2005 by Sean S. Lee et al.
Non-final Office action dated Mar. 18, 2010 in U.S. Appl. No. 11/443,787, filed May 31, 2006 by Sean S. Lee.
Non-final Office action dated Mar. 24, 2010 in U.S. Appl. No. 11/320,318, filed Dec. 28, 2005 by Sean S. Lee et al.
Final Rejection dated Sep. 17, 2010 in U.S. Appl. No. 11/320,318, filed Dec. 28, 2005 by Sean S. Lee et al.
Final Rejection dated Sep. 15, 2010 in U.S. Appl. No. 11/443,787, filed May 31, 2006 by Sean S. Lee.
Non-final Office action dated Oct. 6, 2010 in U.S. Appl. No. 11/825,263, filed Jul. 5, 2007 by Georgann S. Grunebach et al.
Final Rejection dated Mar. 4, 2011 in U.S. Appl. No. 11/825,263, filed Jul. 5, 2007 by Georgann S. Grunebach et al.
Non-final Office action dated Apr. 23, 2012 in U.S. Appl. No. 11/825,263, filed Jul. 5, 2007 by Georgann S. Grunebach et al.
Final Rejection dated Oct. 24, 2012 in U.S. Appl. No. 11/825,263, filed Jul. 5, 2007 by Georgann S. Grunebach et al.
Non-final Office action dated Mar. 20, 2014 in U.S. Appl. No. 11/825,263, filed Jul. 5, 2007 by Georgann S. Grunebach et al.
Non-final Office action dated Jun. 4, 2013 in U.S. Appl. No. 11/825,263, filed Jul. 5, 2007 by Georgann S. Grunebach et al.
Notice of Allowance dated Oct. 21, 2014 in U.S. Appl. No. 11/825,263, filed Jul. 5, 2007 by Georgann S. Grunebach et al.
Final Rejection dated Nov. 13, 2013 in U.S. Appl. No. 11/825,263, filed Jul. 5, 2007 by Georgann S. Grunebach et al.
Non-final Office action dated Sep. 2, 2009 in U.S. Appl. No. 11/320,318, filed Dec. 28, 2005 by Sean S. Lee et al.
Final Rejection dated Sep. 15, 2009 in U.S. Appl. No. 11/443,787, filed May 31, 2006 by Sean S. Lee.

\* cited by examiner

METHOD AND APPARATUS FOR CONTROLLING A MOBILE DEVICE BEYOND AN AREA OF INTEREST BOUNDARY

CROSS-REFERENCE TO RELATED APPLICATIONS

This application is a continuation-in-part of U.S. patent application Ser. No. 11/443,787, filed on May 31, 2006. This application claims the benefit of U.S. Provisional Application No. 60/754,480, filed on Dec. 28, 2005. The disclosures of the above applications are incorporated herein by reference.

TECHNICAL FIELD

The present invention relates generally to a mobile receiving device, and more specifically, to a method and apparatus for controlling the displayed information when a mobile receiving device travels beyond an area of interest such as a designated marketing area.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Federal regulations have specific boundaries enclosing specific areas for which satellite systems are allowed to display rebroadcasted local channels. A satellite system located within one boundary may only display video for all channels associated with that region. Current satellite systems do not include a means for determining a location.

The specific areas are maybe referred to as designated marketing areas defined by land within the United States. Other countries may have similar areas. Therefore, many bodies of water are outside of a marketing area. That is, large bodies of water such as large lakes, bays and bridges over them may fall outside the marketing area. Mobile receiving devices would thus be restricted from receiving local programming even though other services are available from that marketing area.

It would therefore be desirable to provide a system that allows a mobile satellite system to maintain local broadcasting programming when outside a land-based marketing area.

SUMMARY

The present invention provides methods of operating a mobile device that takes into consideration the location of the mobile receiving relative to a designated marketing area.

In one aspect of the invention, a method of operating a mobile device includes determining a location of the mobile device, determining an area of interest fixed on the surface of the earth in response to the location, broadcasting wireless signals having location-specific information therein, displaying the wireless signals corresponding to the area of interest and, when the mobile receiver travels outside the area of interest, maintaining displaying the wireless signals corresponding to the area of interest.

In a further aspect of the invention, a method of operating a mobile device includes determining a location of the mobile device, determining an area of interest fixed on the surface of the earth in response to the location, broadcasting wireless signals having location-specific information therein, displaying the wireless signals corresponding to the area of interest and, when the mobile receiver travels outside the area of interest, determining an extended area of interest and displaying the wireless signals corresponding to the extended area of interest.

In yet another aspect of the invention, a method of operating a mobile device includes determining a location of the mobile device, determining the location devices outside a designated marketing area on the surface of the earth in response to the location, determining a distance to a first designated marketing area, determining a distance to a second designated marketing area, to comparing the first distance and the second distance to determine a shortest distance, selecting a selected designated marketing area from the first designated marketing area and the second designated marketing area, broadcasting wireless signals having location-specific information therein and displaying the wireless signals corresponding to the selected designated marketing area.

A method may take into consideration a global positioning system or other device such as a cellular tower-based system, radio or TV tower for location determination.

Other advantages and features of the present invention will become apparent when viewed in light of the detailed description of the preferred embodiment when taken in conjunction with the attached drawings and appended claims.

DETAILED DESCRIPTION

In the following figures the same reference numerals will be used for the same views. The following figures are described with respect to a mobile satellite television system. However, those skilled in the art will recognize the teachings of the present invention may be applied to various types of mobile reception including land-based type systems.

Figure 1:
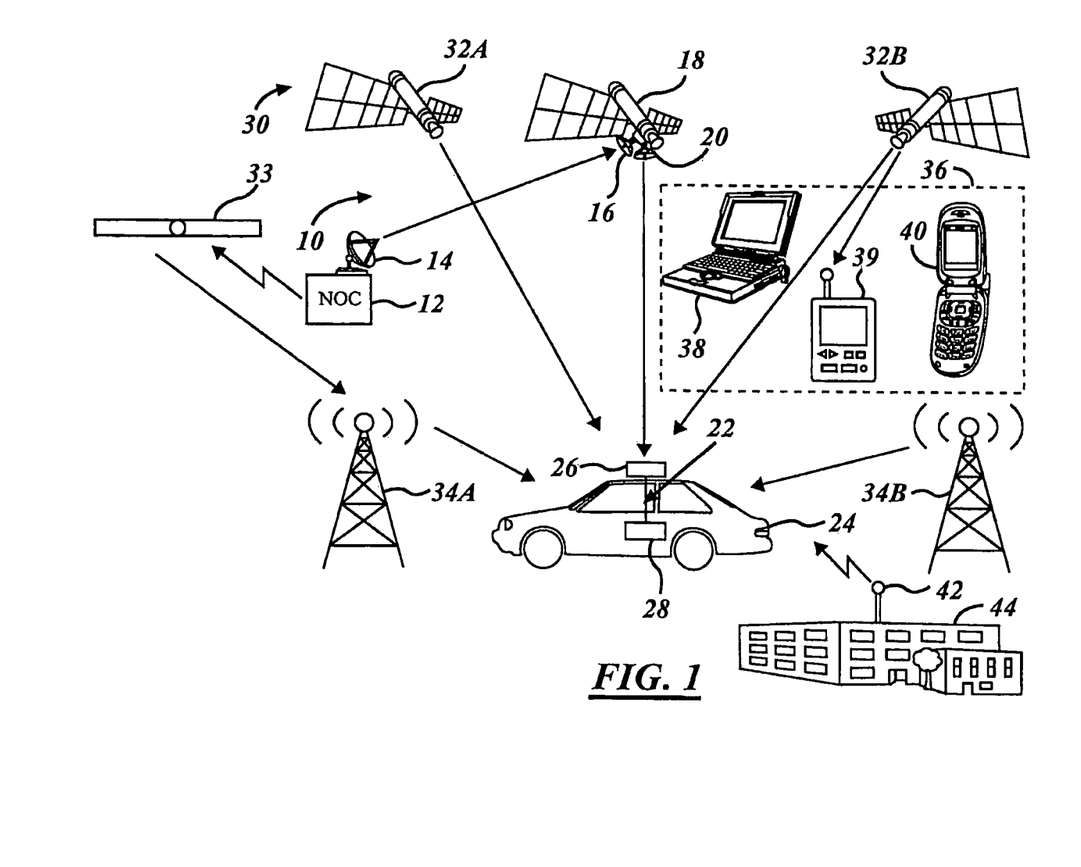
FIG. 1 is a system level view of a satellite broadcasting system according to the present invention.

Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a spaced-based system such as a satellite 18. The wireless signals, for example, may be digital. As will be described below, the wireless signals may be entertainment content or boundary point data for areas of interest such as designated marketing areas. Areas of interest may also include traffic, weather, hazardous material warning areas, advertising marketing area near a particular store or region or other types of areas. A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. As illustrated, the mobile receiving system 22 is disposed within an automotive vehicle 24. A receiving antenna 26 receives the wireless signals from the satellite 18 and processes the signals in a mobile receiving unit 28. The mobile receiving unit 28 will be further described below.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. The towers may be cellular phone, radio or TV towers. Cellular phones typically include a GPS locating system. As the vehicle 24 moves about, the exact coordinates in latitude and longitude may be used to determine the proper area of interest such as a designated marketing area which will control the mobile devices choices for local television and such broadcasted data.

The system may also receive boundary information such as boundary points of designated marketing area polygons from the terrestrial-based system such as the cellular towers 34A and 34B. In addition, the satellites may also be replaced with stratospheric platforms 33 for transmitting the designated marketing areas to the mobile device. Stratospheric platforms are manned or unmanned airplanes, airships, or the like that fly above commercial airspace. It is envisioned that stratospheric platforms may fly at altitudes between 60,000 and 100,000 feet from the surface of the earth. Thus, the stratospheric platforms are in a significantly lower position than even low earth orbit satellites.

The present invention may also be used for displaying various wireless information on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Other types of information may be broadcast from other types of broadcasting areas such as an antenna 42 on a building 44. The building 44 may be various types of buildings such as a store and the wireless information transmitted from the antenna 42 may be advertising information. All of the wireless signals preferably include location information transmitted therewith. As will be described below, the information may be coded digitally into the signals. Thus, by reviewing the location information, signals appropriate for the location of the mobile devices may be displayed on the various devices. This will be further described below.

Figure 2:
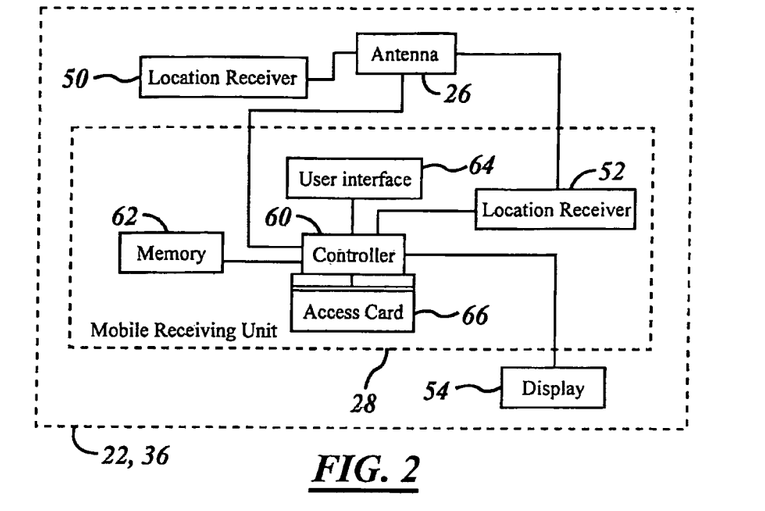
FIG. 2 is a block diagrammatic view of a vehicle having a receiving system according to the present invention.

Referring now to FIG. 2, a receiving unit 22 is illustrated in further detail. Antenna 26 may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a location receiver 50 such as GPS receiver. The antenna 26 may also be an electronic antenna.

The mobile receiving unit 28 is coupled to antenna 26. The mobile receiving unit 28 may also include a location receiver 52 integrated therein. The location receiver 52 may be a GPS receiver. In a preferred embodiment, only one location receiver 50, 52 may be provided in the system. However, the location receiver 50, 52 may be part of the vehicle 24 or may be part of the mobile receiving system 22, 36. The controller 60 may be coupled directly to GPS receiver 52 and/or GPS receiver 50. The mobile receiving unit 28 includes a display 54. The display 54 may be incorporated into the device 36 or within the vehicle 24.

A controller 60 that is microprocessor-based may be used to control the various functions of the receiving unit 28. Such functions include acting as a tuner, receiver, decoder, buffer and other functions. The controller may be similar to that found in current DirecTV set top boxes which employ a chip-based multifunctional controller. The controller 60 may include or be coupled to a memory 62. Memory 62 may be used to store the boundaries of various areas of interest received from the antenna as broadcast by one of the devices 32, 33 or 34 described above. An area of interest is a fixed geographic or cartographic area bounded by a closed shape such as a polygon, circle, curved or straight line segments, or the like. The fixed area or closed shape has outer boundaries that do not move on the surface of the earth. As will be shown below, areas may be excluded (island-like) within a closed shape. Although the areas are fixed, they may be, from time to time, redetermined and rebroadcast to the mobile device for usage. A key feature is that as the vehicle or mobile device moves, the area of interest remains fixed on the surface of the earth and thus the device may enter into another area of interest. Boundaries of certain areas of interest such as a designated marketing area (DMA) may be defined by Nielsen and may be pre-programmed into the memory 62 as a number of polygons wherein each point of each side is defined in cartographic coordinates of longitude and latitude and fractions of degrees. As will be described below the polygons may be formed of corners whose latitude and longitude are stored within the memory.

The location receiver 52 is capable of providing latitude and longitude to the controller 60. The controller 60 may be used to compare the location signals from the location receiver 50, 52 to the boundaries of the areas of interest such that the mobile device can determine which areas of interest it is within and which areas of interest it is not within. From this determination it can control IRD behavior such as allowing or disallowing display of certain audio or video channels. One application is to broadcast areas of interest that represent designated marketing areas to determine which designated marketing area the mobile device is within and which area it is not within, which signals the system should be receiving. These signals may coincide with or coordinate to the local broadcasting signals for the specific designated marketing area. It should be noted that more than one designated marketing area may be provided for a particular area. That is, adjacent areas may also be authorized for viewing. Various fringe regions may be used around a particular designated marketing area to provide hysteresis for the system. This function will be further described below.

The controller 60 may also be coupled to a user interface 64. User interface 64 may be various types of user interfaces such as a keyboard, push buttons, a touch screen, a voice activated interface, or the like. User interface 64 may be used to select a channel, select various information, change the volume, change the display appearance, or other functions. The user interface 64 is illustrated as part of the mobile receiving unit. However, should the unit be incorporated into a vehicle, the user interface 64 may be located external to the mobile receiving unit such as dial buttons, voice activated system, or the like incorporated into the vehicle and interface with the mobile receiving unit.

An access card 66 may also be incorporated into the mobile receiving unit. Access cards such as conditional access module (CAM) cards are typically found in DirecTV units. The access card 66 may provide conditional access to various channels and wireless signals generated by the system. Not having an access card or not having an up-to-date access card 66 may prevent the user from receiving or displaying various wireless content from the system.

Figure 3:
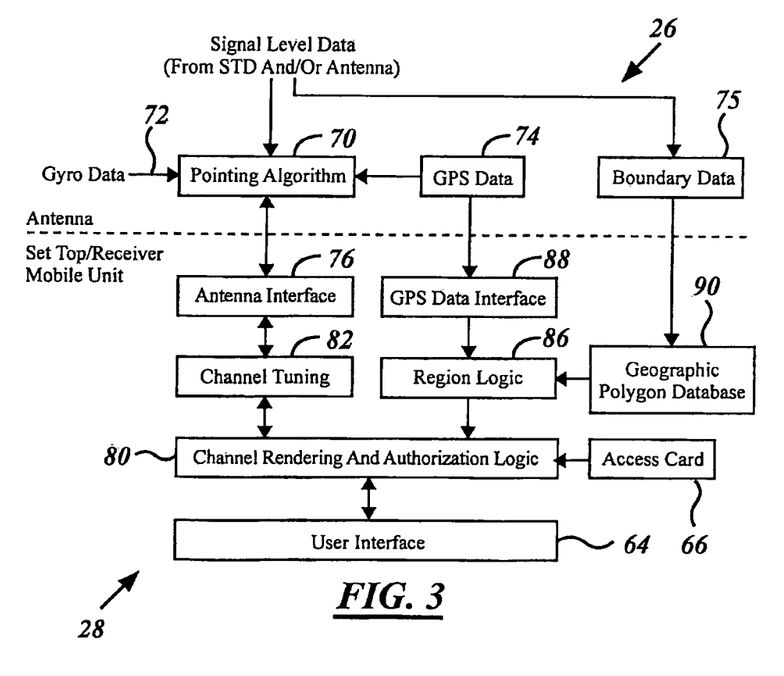
FIG. 3 is a block diagrammatic view of the various logic of the antenna and the set top mobile receiving unit.

Referring now to FIG. 3, a block diagrammatic view of the mobile receiving unit 28 and the antenna 26 is illustrated. The boxes here represent the software logic that may be used to implement the invention. Various information may be associated with the antenna 26. The antenna 26 may include a pointing algorithm 70 therein. The pointing algorithm 70 may receive information from gyros in the antenna and be provided as gyro data 72. GPS data 74 may be provided from the GPS or location receiver 50, 52 illustrated above in FIG. 2. Other information may be provided from the mobile receiving unit such as channel tuning information and the like.

The antenna may also be used to receive boundary data 75 from the various sources described above. The boundary data may be received from a satellite, a terrestrial-based system, or a stratospheric platform. The boundary data 75 is stored within the memory 90. The boundary data may include many forms including equations for line segments, corners of intersections of line segments in latitude and longitude, or other information defining the boundaries of the designated marketing areas.

The mobile receiving unit 28 may include an antenna interface 76 that is used to communicate with the antenna. The antenna interface 76 formats the signals from the mobile receiving unit. For example, various signal level data such as the channel tuning information may be provided. Data from the user interface 64 and the conditional access card 66 may be used by the channel rendering and authentication logic 80. The channel rendering and authentication logic 80 may authorize the particular user based upon the conditional access card. Information entered from the user interface such as a password may also be used in the authentication logic. Various methods for authentication are well known in the art. The channel rendering portion of the channel rendering and authentication logic 80 receives information from the user interface 64 as to which wireless signals the user would like to receive. The channel rendering and authentication logic 80 generates signals that are provided to the channel tuning logic 82. The channel tuning logic 82 provides channel tuning information based upon the channel rendering information. The channel tuning logic 82 may include a receiver and a decoder used for receiving and decoding the appropriate channels. The channel tuning logic may provide information to the antenna interface 76 such as the direction of the signal or satellite that contains the particular channel that is desired. This information may be used by the pointing algorithm 70 to rotate the antenna in the appropriate direction.

The controller may also include receiving logic 86. The receiving logic 86 may provide information to the channel rendering logic as to the particular region that the antenna or the mobile receiving unit is located. The region logic 86 may be coupled to the GPS data interface 88. The GPS data interface 88 provides GPS information to the region logic so that appropriate signals may be received or displayed.

One use of the receiving logic 86 is that based upon the GPS signals, the location of the receiving unit may be selected. The receiving logic 86 may then look up in a geographic polygon or location database 90 which designated marketing area the receiving device is located. From this information the appropriate geographically specific data such as local broadcast television channels may be selected. The database 90 may consist of polygon boundary information used to define the marketing areas. The database 90 may also include other information such as zip code information or other ranges of data used for comparison with the signals. As will be evident to those skilled in the art, the wireless signals may be received with various location data used to identify the location appropriate for the signal to be displayed in. For example, the data may include information such as that the particular signal may be a local broadcast from the Washington, D.C. area, whereas other signals may indicate local broadcasting from the Baltimore area. When the vehicle is in the proper location, the proper signal may be displayed on the mobile device.

The location information may be provided in various portions of the signal. If the signal is an all digital signal the location information may be provided in a preamble of the information packet. If the signal is an analog signal the location data may be included in a vertical blanking interval of an analog television signal or as unused bandwidth of a digital television signal. In a purely analog signal, the location data may be superimposed digitally on the analog signal.

Figure 4:
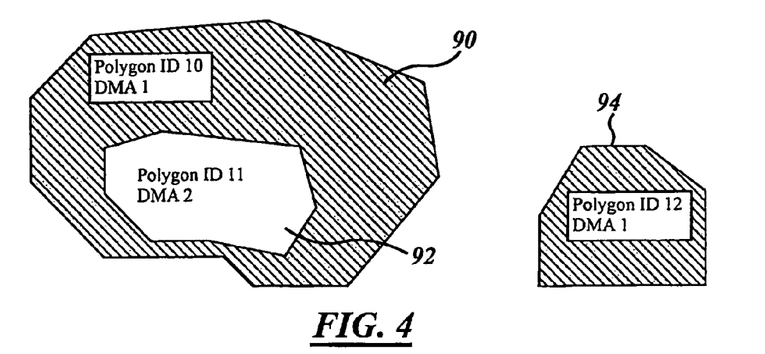
FIG. 4 is an example of various combinations of regions that can be described using polygons according to the present invention.

Referring now to FIG. 4, an example of a complex fixed designated marketing area on the surface of the earth is shown. A polygon having ID 10 and an assigned market area value of 1 is shown as area 90. Area 92 corresponds to a polygon ID of 11 and an assigned market ID value of 2. Polygon 94 is also of market area 1 and has a polygon ID of 12. It should be noted that each of the polygons are closed polygons. It should also be noted that there is no overlap between Area 92 and Area 90 such that Area 92 is an island inside Area 90. Area 90 taken by itself contains a hole the shape of Area 92. One method for determining boundaries of a polygon as a set of longitude and latitude points is set forth as:

```
typedef struct {
    polygon id
    number of polygon points
    for (i = 0; i < number of market areas in object; i++) {
        latitude degrees value
        latitude 1/1000 minutes value
        longitude degrees value
        longitude 1/1000 minutes value
} POLYGON_T;
```

The unique polygon ID may be used in a data structure such that the designated marketing area can be a set of unjoined polygons as well as excluded regions as set forth in:

```
typedef struct {
    DMA id
    length of DMA
    number of included regions
    for (i = 0; 1 < number of included regions; i++) {
        polygon Id
    }
    number of excluded regions
    for i = 0; i< number of excluded regions; i ++) {
        polygon id
    } DMA T:
```

A representation of the designated marketing area 1 may be illustrated in code as:

| | |
|---|---|
| DMA id | 1 |
| number of included regions | 2 |
| polygon id | 10 |
| polygon id | 12 |
| number of excluded regions | 1 |
| polygon id | 11 |

Figure 5:
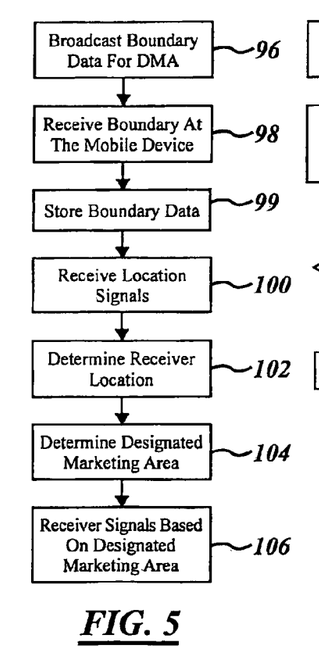
FIG. 5 is a flow chart illustrating one method for operating the present invention.

Referring now to FIG. 5, a method for operating a television broadcasting system is illustrated. In step 96 the boundary data for the designated marketing area is broadcast by one of the types of devices described above such as a satellite, a terrestrial-based antenna, a cellular tower, or stratospheric platform. In step 98 the boundary information is received at the mobile device. In step 99 the boundary data is stored in the memory of the mobile device.

In step 100, the system or mobile device receives location signals. The receiver location is determined from the location signals in step 102. As mentioned above, the location signals may use GPS satellites or cellular telephone systems for determining the exact longitude and latitude down to an acceptable limit to determine the location of the mobile receiving device.

In step 104, the designated marketing area for the receiver location is determined. As mentioned above, various polygons or the like may be stored in the memory of the receiving device so that the particular designated marketing area at that moment in time for the position of the mobile receiving device may be determined. A lookup table for coordinates may be set forth or polygonal areas may be set forth to determine in which designated marketing area the mobile receiving device is located. If the system is not used for television signals, this step may be optional. Determining inclusion within a designated marketing area is set forth in FIG. 7.

In step 106, the controller of the system selects the particular local channel based upon the determination of the designated marketing area in step 84. Of course, some hysteresis may be accounted for in this method.

Referring now to FIGS. 6A-6D, various irregular shaped closed polygons are illustrated. The mobile device is located at the respective point 110A-110D in each of the various figures, respectively. The polygonal shapes 112A-112E are shown as irregular shapes. When the system is operated, it is not known whether the mobile device is located within or outside of the boundaries. One method for determining this is using a point inclusion detection algorithm. A line is arbitrarily drawn in a direction from the mobile device or point 110 in each of the figures. This is performed using a raycasting technique. In the raycasting the number of intersections with a line is determined. Although in FIG. 6 horizontal lines are shown, various other directions may be drawn.

Figure 6A:
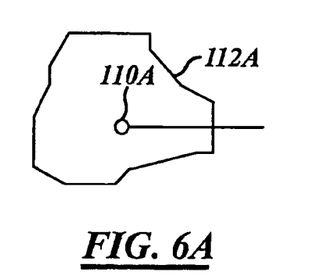
FIGS. 6A-6E are a top view of various polygons for use in a point inclusion detection algorithm.

In FIG. 6A, the number of intersections between the point 110A and the polygon is one. Therefore, any odd numbered amounts correspond to the mobile device being within the polygon.

Figure 6B:
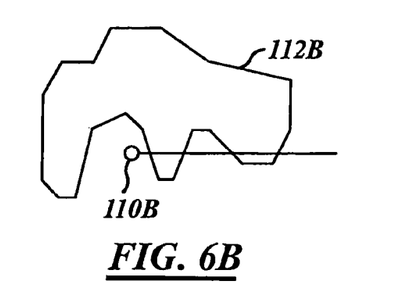

Referring now to FIG. 6B, four intersections of the line from point 90B is illustrated. Thus, a count of the number of intersections is four and thus the point is outside the polygon.

Figure 6C:
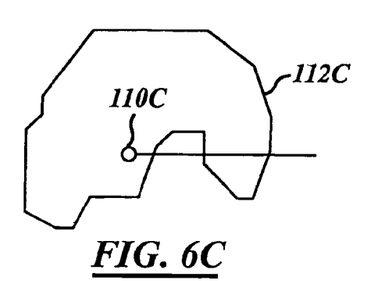

In FIG. 6C, three intersection points are counted. Therefore, the point 90C is within the designated marketing area.

Figure 6D:
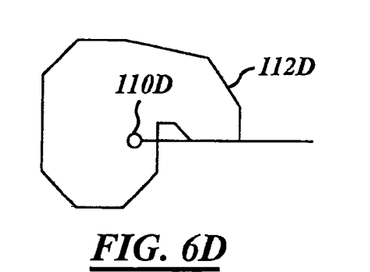

In FIG. 6D, the points of the polygon are on the GPS points line. In this case, all the polygon points should be ignored as intersections and only when the polygon's points have crossed the GPS line should an intersection be counted. In this case, there is just one intersection and the GPS point is therefore inside the polygon because of the odd number.

In summary, an odd number of intersections indicates that a point is within a polygon. An even number of intersections indicates the GPS point is outside the polygon.

Figure 6E:
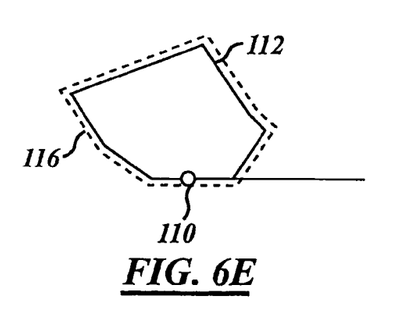

Referring now to FIG. 6E, the GPS point 110E is on the boundary of the polygon. In this case the GPS point will be defined as being inside the polygon. Because the boundary of one polygon is likely to be the boundary of an adjacent polygon, the GPS point 110E may be a member of multiple regions when it lies on the boundary lines between the areas of interest. This may be confusing for a system. Therefore, if the mobile device is within the polygon and is moving toward the boundary, hysteresis buffer zone 116 may be provided around the polygon so that not until the vehicle or mobile device leaves the buffer zone 116 would the behavior of the mobile device change.

Figure 7:
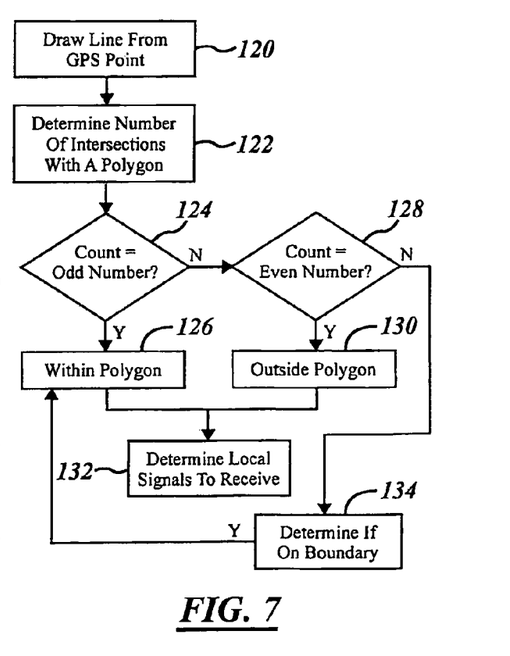
FIG. 7 is a flow chart illustrating a point inclusion detection algorithm.

Referring now to FIG. 7, a method for performing a point inclusion detection algorithm is illustrated. In step 120, a line is drawn from a GPS point. In step 122, the number of intersections of the line with the closed polygon is determined. In step 124, if an odd number is counted in step 124, step 126 determines that the system is within the polygon and within the designated marketing area.

Referring back to step 124, if the count is not odd step 128 is executed. In step 124, if the count is even, the system is outside the polygon in step 130. If the count is not even or odd in step 128, step 132 is executed in which it is determined whether or not the system is on a boundary. A boundary system is illustrated in FIG. 5E above. If the system is on a boundary, the system determines whether it is within a polygon in step 134. After both steps 126 and 130 are executed, the controller of the system determines the local signal to receive based upon the designated marketing area. These channels are displayed on the display of the receiving device.

Figure 8:
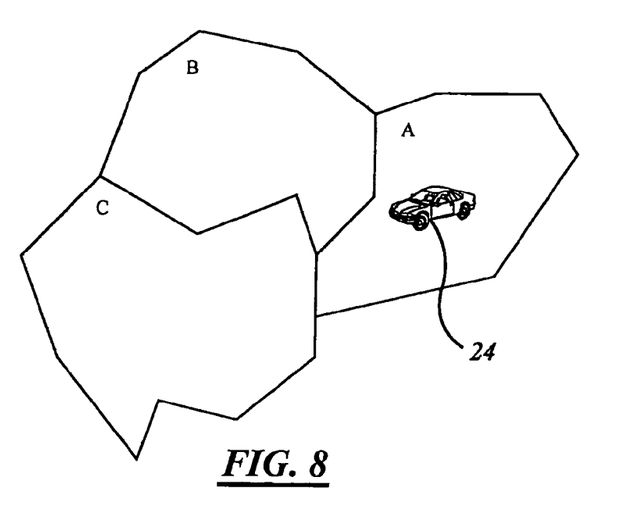
FIG. 8 is a top view of three adjacent polygonal direct marketing areas.

Referring now to FIG. 8, a plurality of designated marketing area polygons are illustrated as A, B, and C. At some segment each of the polygons are adjacent to each other. The points representing each polygon may follow any arbitrary rule such as political boundaries, geographic boundaries, or any areas of interest. Various types of information may be transmitted to the mobile device such as vehicle 24 to convey the boundaries. In one implementation, the mobile device may receive corner points in latitude and longitude. Based upon the boundaries of the polygon, the device may determine in which polygons it is inside and which it is outside. Various actions may be performed by the mobile device as a result of determining which polygon it is in based upon coded actions or instructions that use the broadcasted polygon.

Figure 9:
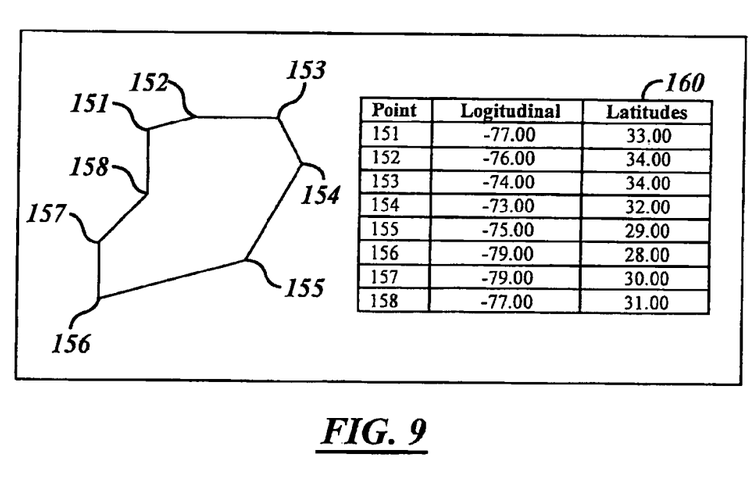
FIG. 9 is a top view of polygonal region A of FIG. 8 with a table identifying the corner points.

Referring now to FIG. 9, polygon A of FIG. 8 is illustrated in further detail. Each of the corner points represents an intersection of two line segments of the polygon. In this example, points 151 through 158 represent corners of the polygon. Table 160 includes the point, the longitude and the latitude of each of the corner points. Thus, the points representing the polygon may be transmitted in a data structure that will be received by the receiving device as an object used for comparison with the GPS location. One example of a C-style structure of an object is set forth below.

```
struct geographic_polygon {
    int             unique_id;
    int             version;
    int             number_of_points;
    for (i = 0; i < number_of_points; i++) {
        int         longitude_degrees;
        int         longitude_minutes;
        int         longitude_seconds;
        int         latitude_degrees;
        int         latitude_minutes;
        int         latitude_seconds;
    }
}
```

Thus, each geographic polygon may be transmitted as a unique object that may be referenced individually. In this manner, a series of geographic polygons can be transmitted to a mobile device and stored in a memory such as dynamic random access memory or a non-volatile memory such as flash memory. This memory may then be periodically referenced as the mobile device's GPS coordinates change. By comparing the GPS coordinates with the polygonal boundaries, the receiving device may determine which polygon it is in and which polygon it is outside of. Various actions may be taken in response to the particular polygon, such as the types of displays or assorted messages may be displayed to the user, various audio clips may be played, allowing or blocking various channels to be displayed on the display device, or tuning to a particular broadcast channel may be performed in response to the comparison to the polygonal boundaries and the GPS coordinates.

One example of a use of broadcasted polygons is for providing designated marketing areas for local channel display or blockage. The satellite or other device may broadcast a geographic polygon for each designated marketing area because the designated marketing area has a unique ID and version, updates to a particular polygon representing a designated marketing area may be dynamically performed in the future. The mobile receiver then evaluates its location in reference to which polygon it is in and as a result, various expressions may be activated or deactivated. This may take the form of activating or deactivating various local channels.

Another example of the use of the present invention is in emergency weather situations where all mobile receiving devices in a geographic area may be notified of an impending severe weather situation. This may also be used for non-weather situations such as in conveying disaster information. In this manner, a complex polygon may be broadcast and vehicles within the polygon may receive the message detailing the specific weather or other type of alert.

Figure 10:
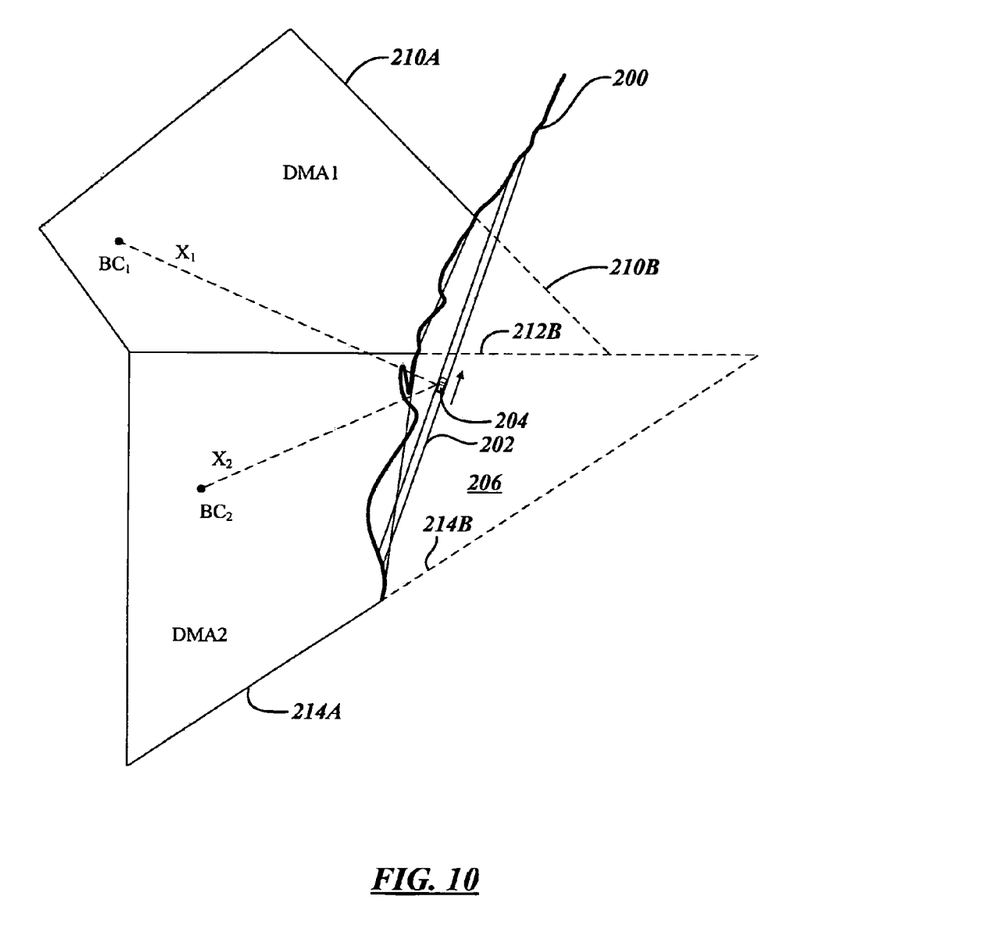
FIG. 10 is a topographic view of a portion of the earth having two designated marketing areas and a receiving device therein.

Referring now to FIG. 10, it may be useful to extend areas of interest outside its allocated boundary such as into a water area not currently served. The following description is provided with respect to a designated marketing area. However, the examples may extend to all types of areas of interest described above. A first designated marketing area DMA 1 and a second designated marketing area DMA 2 are illustrated having a broadcast center BC1 and a broadcast center BC2, respectively. In this illustration, DMA 1 and DMA 2 are directly adjacent. They may also be separated as well. A shoreline 200 is illustrated along the Eastern-most edge of the first designated marketing area DMA 1 and the second designated marketing area DM 2. Thus, the edge of the DMA 1 and DMA 2 are at a water-land boundary. A bridge 202 connects the shoreline 200 at different places. The bridge 202 has a mobile receiving device 204 (such as in an automobile) thereon. The bridge 202 is over a water area 206.

Designated marketing area DMA 1 has a boundary 210A and an extension 210B. Boundary line 212A has an extension line 212B and boundary line 214A has an extension 214B. As will be described below, various methods for using the designated marketing areas in extending the designated marketing areas beyond a land-water boundary are described below. Of course, those skilled in the art will recognize that more than just a land-water based boundary may be used. That is, a land-based boundary of a DMA or areas of interest may also incorporate the teachings of the present invention.

Figure 11:
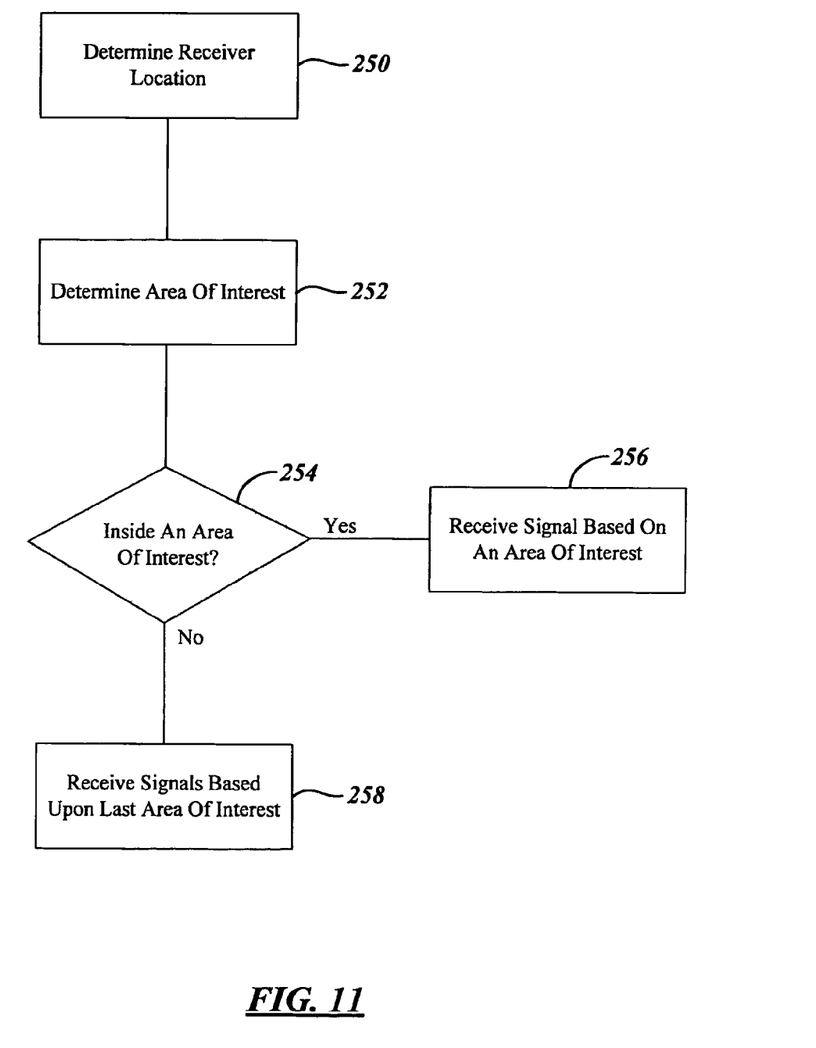
FIG. 11 is a flowchart of a first embodiment of the disclosure for extending the designated marketing area.

Referring now to FIG. 11, one method for extending the area of interest into an area not served by an area of interest or a designated marketing area includes maintaining the programming permissions associated with the last designated marketing area in which the mobile receiving device was present.

In step 250, the location of the mobile receiving device is determined. In step 252, the area of interest is determined. In step 254, if the receiving device is inside the area of interest, step 256 allows the device to receive or utilize signals based upon the area of interest.

Referring back to step 254, if the receiving device is not within an area of interest, then step 258 is performed. In step 258, signals are continued to be received or utilized based upon the last area of interest in which the receiving device was present. For example, in FIG. 10, the mobile receiving device is on a bridge 202 traveling from designated marketing area DMA 2 to designated marketing area DMA 1 as indicated by the arrow. Because the receiving device 204 is not within either designated marketing area, the last designated marketing area, DMA 2, is used until the vehicle crosses into designated marketing area DMA 1.

Figure 12:
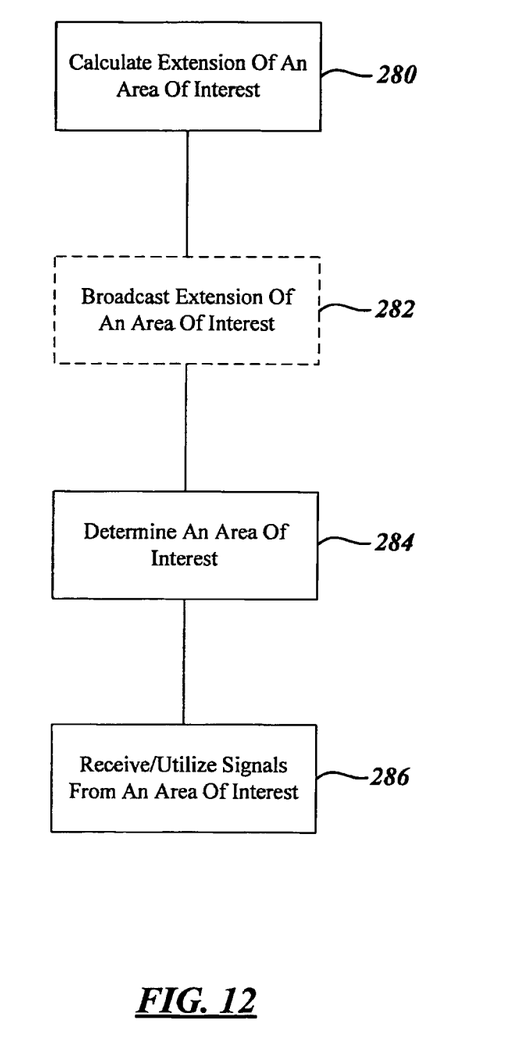
FIG. 12 is a flowchart of a second embodiment of the disclosure for determining a designated marketing area.

Referring now to FIG. 12, another method for retaining local programming rights is set forth. In this example, the area of interest may be extended in step 280. The mobile receiving device may calculate extensions of various area of interest boundary lines such as those set forth with the B-designators associated with the designated marketing areas in FIG. 10. That is, extensions are illustrated as elements 210B, 212B, and 214B. Thus, the designated marketing area extends beyond the shoreline into the water-based area 206. As is illustrated, the extensions extend existing lines of the designated marketing area into the water-based area 206. The extensions may not be continuous portions of lines, but rather extend in a particular direction such as, on the East coast of the United States straight East, whereas on the West coast, extensions may be performed straight West. Of course, arbitrarily chosen directions may be used.

In step 282, extensions of the area of interest may also be broadcast rather than calculated. The areas of interest may be broadcast by various devices terrestrially or extra-terrestrially as described above and received by the mobile receiving device stored therein.

In step 284, the proper area of interest is determined based upon the calculations or the broadcast received from the system. In step 286, the receiver device receives or utilizes the signals based upon the area of interest. The receiver device may, thus, receive the proper local signals.

Figure 13:
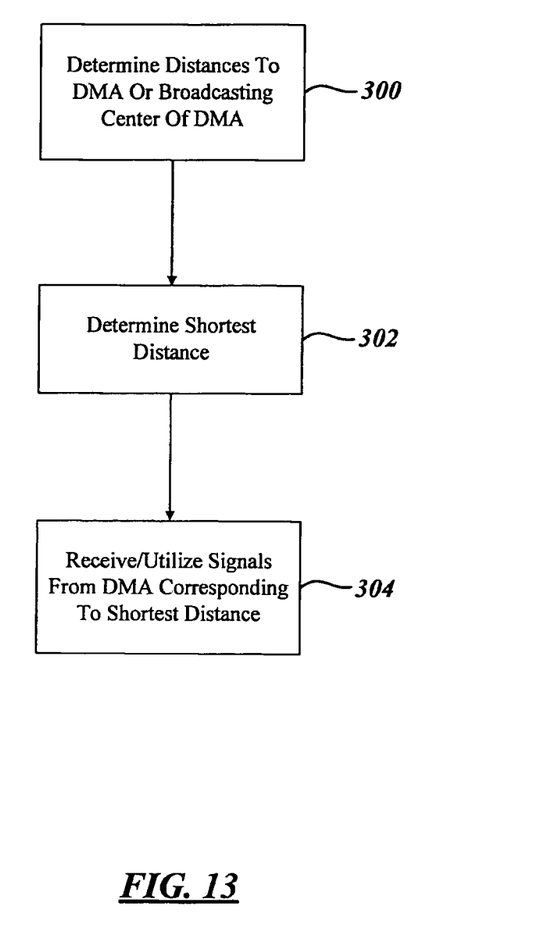
FIG. 13 is a flowchart of a third embodiment for determining a designated marketing area.

Referring now to FIG. 13, an alternative continuation of FIG. 11 is set forth. Although a DMA is set forth, this example may be used for an area of interest. Rather than performing step 258 in FIG. 11, steps 300 through 302 may be performed.

That is, after step 254 and determining system is not inside a designated marketing area, distances may be determined to the various adjacent designated marketing areas in step 300. The distance may be to the edge or boundary of the designated marketing area or the distance to one of the broadcast centers BC 1 and BC 2 as illustrated in FIG. 10. The U.S. Federal Government (FCC) maintains a list of the broadcast center locations for designated marketing areas. In step 300, the distances X1 and X2 are determined. The shortest distance, X1 or X2, is chosen. In step 304, the receiver device utilizes signals from the DMA to the shortest distance. As mentioned above, the shortest distance may be to a DMA characteristic such as the broadcast center BC 1 or BC 2 or to the nearest boundary line. Thus, based on the shortest distance to the desired designated marketing area characteristic, the proper designated marketing area may be determined and the receiving device can receive local programming based thereon.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a mobile device comprising:
   determining a location of the mobile device;
   determining the mobile device is outside a designated marketing area fixed on the surface of the earth in response to the location;
   determining a first distance to a first designated marketing area;
   determining a second distance to a second designated marketing area;
   comparing the first distance and the second distance to determine a shortest distance;
   selecting a selected designated marketing area from the first designated marketing area and the second designated marketing area based on the shortest distance;
   broadcasting wireless signals have location specific information therein; and
   displaying the wireless signals corresponding to the selected designated marketing area.

2. A method as recited in claim 1 wherein determining the first distance comprises determining the first distance to a first designated marketing area boundary.

3. A method as recited in claim 1 wherein determining the second distance comprises determining the second distance to a second designated marketing area boundary.

4. A method as recited in claim 1 wherein determining the first distance comprises determining the first distance to a first broadcast center.

5. A method as recited in claim 1 wherein determining the second distance comprises determining the second distance to a second broadcast center.

* * * * *